(12) United States Patent
Cochran

(10) Patent No.: US 11,204,278 B2
(45) Date of Patent: Dec. 21, 2021

(54) METHOD AND SYSTEM FOR MONITORING AND CONTROLLING ONLINE BEVERAGE CAN COLOR DECORATION SPECIFICATION

(71) Applicant: Pressco Technology Inc., Cleveland, OH (US)

(72) Inventor: Don W. Cochran, Gates Mills, OH (US)

(73) Assignee: PRESSCO TECHNOLOGY INC., Cleveland, OH (US)

(*) Notice: Subject to any disclaimer, the term of this patent is extended or adjusted under 35 U.S.C. 154(b) by 87 days.

(21) Appl. No.: 16/280,691

(22) Filed: Feb. 20, 2019

(65) Prior Publication Data

US 2019/0257692 A1 Aug. 22, 2019

Related U.S. Application Data

(60) Provisional application No. 62/632,955, filed on Feb. 20, 2018.

(51) Int. Cl.
*G01J 3/28* (2006.01)
*G06T 3/00* (2006.01)
(Continued)

(52) U.S. Cl.
CPC ............... *G01J 3/2823* (2013.01); *G01J 3/36* (2013.01); *G06T 3/0043* (2013.01); *G06T 7/80* (2017.01); *G06T 7/90* (2017.01)

(58) Field of Classification Search
CPC .................................. G01J 3/2823; G01J 3/36
See application file for complete search history.

(56) References Cited

U.S. PATENT DOCUMENTS 5,120,126 A 6/1992 Wertz et al.
5,245,399 A * 9/1993 Wertz ...................... B07C 5/342
250/226
(Continued)

OTHER PUBLICATIONS

Amir Novini, "White Paper: Colorimetric Technology for Can Makers," Applied Vision Corporation,. pp. 1-11, 2011.
(Continued)

*Primary Examiner* — Tuan H Nguyen
(74) *Attorney, Agent, or Firm* — Fay Sharpe LLP

(57) ABSTRACT

A system is provided in an automated machine vision inspection environment. The system includes inspection cameras and a spectrophotometer or spectrometer, both implemented to be used online to detect the absolute colors of printed portions of items being inspected. The spectrophotometer or spectrometer is aimed at a fixed spot within a field of view of one of the digital cameras of an inspection system, which has a-priori knowledge as to exactly where the spectrophotometer or spectrometer is aimed. The image taken by the camera will be used to determine whether the desired measurement spot on the decoration pattern has actually been measured by the most recent snap of the spectrophotometric data. When the vision system determines that the spectrophotometer or spectrometer was truly aiming at the correct region when it captured its inspection data, it will instruct the system to accept the color measurement and will log the related data and information accordingly. If the correct spot is not measured, the data may simply be discarded or may be kept for other uses.

23 Claims, 9 Drawing Sheets

(51) Int. Cl.
    *G06T 7/80*     (2017.01)
    *G06T 7/90*     (2017.01)
    *G01J 3/36*     (2006.01)

(56)     References Cited

U.S. PATENT DOCUMENTS

| | | |
|---|---|---|
| 5,374,988 A | 12/1994 | Wertz et al. |
| 5,432,545 A | 7/1995 | Connolly |
| 5,505,312 A | 4/1996 | Haring et al. |
| 5,911,003 A | 6/1999 | Sones |
| 6,151,064 A | 11/2000 | Connolly et al. |
| 7,043,326 B2 | 9/2006 | Neubauer et al. |
| 7,209,575 B2 | 4/2007 | Spaeth |
| 7,289,215 B2 | 10/2007 | Spady et al. |
| 7,313,270 B2 | 12/2007 | Sones |
| 7,394,937 B2 | 7/2008 | Sones |
| 7,633,614 B2 | 12/2009 | Haugholt et al. |
| 7,667,836 B2 | 2/2010 | Sones et al. |
| 7,684,034 B2 | 3/2010 | Sones et al. |
| 7,773,214 B2 | 8/2010 | Sones et al. |
| 7,787,111 B2 | 8/2010 | Kim et al. |
| 7,839,498 B2 | 11/2010 | Mestha et al. |
| RE42,715 E | 9/2011 | Sones |
| 8,014,586 B2 | 9/2011 | Sones et al. |
| 9,046,356 B2 | 6/2015 | Adam et al. |
| 9,633,287 B2 | 4/2017 | Kawabata et al. |
| 2003/0179920 A1 | 9/2003 | Hooker et al. |
| 2007/0064229 A1 | 3/2007 | Norton et al. |
| 2012/0044540 A1 | 2/2012 | Dalal et al. |
| 2012/0216689 A1* | 8/2012 | Cochran .............. B41F 33/02 101/39 |
| 2013/0022250 A1 | 1/2013 | Nygaard et al. |
| 2015/0283586 A1 | 10/2015 | Dante et al. |
| 2017/0011246 A1 | 1/2017 | Blatt et al. |
| 2017/0331976 A1* | 11/2017 | Bai .................. H04N 1/628 |

OTHER PUBLICATIONS

Christine Connolly, "Industrial colour inspection case studies," The Colour Image Processing Handbook, Chapter 17, pp. 377-384, 1998.
Christine Connolly et al., "Colour measurement by video camera," JSDC, vol. 111, pp. 373-375, Dec. 1995.
C. Connolly et al., "The use of video cameras for remote colour measurement," JSDC, vol. 112, pp. 40-43, Feb. 1996.
International Search Report for PCT/US2019/018743 dated May 6, 2019.

* cited by examiner

METHOD AND SYSTEM FOR MONITORING AND CONTROLLING ONLINE BEVERAGE CAN COLOR DECORATION

SPECIFICATION

This application is based on and claims priority to U.S. Provisional Application No. 62/632,955, filed Feb. 20, 2018, which is incorporated herein by reference in its entirety.

TECHNICAL FIELD

The presently described embodiments relate to the color decoration of beverage cans or other generally cylindrical objects as they are manufactured at high speed. This can include a wide range of consumer product packaging such as caulking tubes, frozen juice containers, pudding cups and beverage containers.

BACKGROUND

In the 2-piece beverage can industry, aluminum and steel cans are printed or "decorated" around their periphery on high speed rotary machines, referred to generically as decorators or decorator machines or systems. Although the fundamental design configuration of the decorator machines has not changed substantively in over 40 years, it has undergone continual evolutionary type tweaking to allow the machines to function at higher and higher speeds. Some of the highest speed decorators can operate well in excess of 2,400 cans per minute. The latest trend is, instead of simply ratcheting-up the speed of a single lane of can decoration, they will split the line and have it handled by two slightly slower decorators.

In any event, the process is happening too fast for it to be observed by human eyes with any depth of discrimination. The human eye is incapable of performing "stop action" functions. Humans typically try to move their head and eyes to somehow synchronize their vision with movement—but such attempt to synchronize are ineffective at higher speeds and certainly ineffective at speeds of 2400 items per minute. Even with the aid of stroboscopic illumination at the contemplated speed of the noted decorator systems and appurtenant machine vision technology (e.g in excess of 2400 items per minute, noted above), it is still not possible for a human viewer to derive the necessary information to determine if the printing process is running correctly and within the process control limits. Even if a human is able to see the cans with the aid of a strobe in such an environment, it is simply not humanly possible to adequately manually inspect the can decoration at the speeds that are typical of the modern day decorator. Human vision, though it is an amazing design, cannot work to the absolutely definitive color specifications that are verifiable only with calibrated instrumentation. Even if an operator could somehow view the cans at a sufficient speed, the operator could not view 360° around the can at an advantageous angle to verify all the various aspects of the printing.

In recent years, multi-camera high speed vision inspection systems have been employed to monitor the quality of the can decoration. Such a high speed vision inspection technology is described in patent application U.S. patent application Ser. No. 13/277,157, filed Oct. 19, 2011, and is incorporated herein by reference in its entirety.

To perform a comprehensive inspection of the can 360° around its perimeter, it is typical to "unwrap" the periphery of the can image in some form. There are other ways to view its perimeter, but this is the most practical. Essentially, a flat view which looks just like unrolling the can allows for more comprehensive viewing. This can generally be done in at least two ways. A line scan camera can be used to capture a series of (1×N) long single pixel rows, or long, very narrow images (e.g. vertical rows of pixels or narrow line images), which, when reassembled in the computer or vision processor electronics, will approximate an unwrapped image of the outside of the can's decorated surface. This unwrapped image can be thought of as an image "pseudo blanket" because of its imaged similarity to the actual print blanket which applies the ink to the perimeter of the can.

A true image of the actual print blanket would yield an inaccurate image compared to a decorated can image. Because of the compressibility of the polymer from which the print blanket is made, the actual dimensions, compared to the printed can, would be slightly different. The ink colors, when seen on the surface of the print blanket itself, are not a true representation of the colors when the ink is actually imparted to the can's surface. This reality is because the print blanket is a relatively matte finished polymer and has its own color, and is not a highly reflective surface like the metal from which the can is made.

Another way to provide an unwrapped image is to take multiple, more normally proportioned "area scan" images"—for example like 3:4, 16:9, or even 1:1 aspect ratios of the outside perimeter and then correct and splice these area images together to form the "pseudo print blanket" or inspection image. There are many different algorithmic techniques for unwarping, unwrapping and splicing the images back together but a full review and explanation of those techniques is beyond the scope of this disclosure. Once the images are either reassembled or at least pulled into the computer or image processor in a form usable for inspection, the process of analyzing the image to determine the quality of the print must begin. There are many different aspects of the decorated surface of the can which may be desirable to check. The inspection system may be employed to verify that any of dozens of different printing features are being correctly applied to the can.

The actual machine vision algorithm techniques which are used to interrogate the image of the can to determine the existence of flaws is up to the software designers and electronic processing architecture. The specifics for the actual visual inspection in the vision processor or computer is also beyond the scope of this disclosure.

The inspection system may be employed to inspect, for example, smears, mis-registrations, oil spots, torn blankets, swirls, puckers, contamination, incomplete ink transfer, insufficient ink, missing letters/characters/features, and various important aspects related to correct colors. The subject of this disclosure, as will be set forth in greater detail below, is concerned primarily with a novel way of verifying correct colors.

The absolute color is very important for a variety of reasons. Brand owners often rely on a precise color rendition to be consistent throughout their advertising campaigns so that the mere sight of that color invokes thoughts of their product. Some of the popular soda brands invoke exactly that and therefore they want the color rendition on their products to not only be accurate, but to be highly consistent and transportable across all production lines around the world. With the implementation of automated inspection technology on print decorators, manufacturers have realized just how variable the final decorated color can be. While it was once thought, by many, that the colors were relatively stable over fairly long periods of time in the decorator, the monitoring and inspection of every can has raised the awareness that the color can vary over fairly short periods of time in addition to the long term trending that is better known. It can vary or go in and out of specification for a host of reasons, but is often a function of which machine parts were actually responsible for decorating each individual can.

The ink manufacturers will often publicly explain that their long list of over 40 different causes, either solely or in combination, can cause significant variations in the actual measured color on a decorated can. It can be affected by over three dozen independent variables encompassing everything from the maintenance condition of the decorator, to the conditions of the metal substrate, to the details of the decoration process, to the ink itself, to the over varnish conditions, to the various human elements of setup, measurement, and observation.

State of the art vision inspection technologies are typically implemented using digital color video cameras. Although the cameras are not being used to take contiguous frame video information, they are used as a digital electronic way of acquiring high speed (short exposure time) individual images of a product. While it is possible to use extremely intense continuous illumination techniques whereby the camera can use a high speed electronic shutter, it is generally a costlier and less practical solution. In most cases, the high speed images are captured by utilizing strobe illumination to provide an intense pulse of light for a very short duration to "stop the action" and, thus, acquire a crisp and properly timed, minimized blur image into the camera. The illumination on-time is usually less than 150 microseconds, but can range widely depending on the movement and throughput speeds of the deco inspection system. It is well known in the art to use engineered illumination to create an image that has the characteristics most desired to do a particular inspection application. The angles, intensity, relative homogeneity, and color content of the illumination are all important for high quality machine vision inspection in most cases. In the case of the inspection of the color decoration on a can, or all of the 360° perimeter of a cylindrical container, it must be highly engineered to avoid hot spots or specular reflection as well as to gain a consistent imaging quality in all areas that are to be inspected. The inks used to decorate many modern cans are semi-transparent, so the highly specular nature of the underlying aluminum or steel surface becomes a serious consideration in the illumination design. The designer of the illumination is faced with a significant dilemma. Bright field specular illumination is quite challenging to accomplish because the mirrored can will tend to cause an imaging of the actual light source and therefore must be nearly perfect. Also, the often inherently curved outer perimeter of a beverage or food can will act as a reflector of colored light from a source near the focal plane of the camera. The result is adjacent cans being "imaged" in the mirror-like surface of the can which is supposed to be the current subject of the inspection. It is not practical to design a light source that can be continuous around the 360° perimeter, because the stream of cans must move through the illumination field. It is impractical and expensive to articulate each can into and out of a perfectly rotationally consistent illumination field at these extreme speeds. Additionally, bright field illumination washes out most of the color and printed pattern information because of the relatively high illumination intensity. Any deviation in the can's outer periphery from perfectly cylindrical (like dents or structure for example), is amplified and causes significant distortions to many aspects of the image, including the color information. It is somewhat like illuminating a curved and color-tinted mirror. With off-axis illumination from above or below the can, much of the illumination that is incident on the curved, mirror-like surface of the can is simply reflected away from the camera. Only a small fraction of the light is actually reflected by the pigmentation particles in the thin body of the actual ink to be available for camera imaging to achieve a color rendered image.

Today's color cameras, which might typically be employed in a beverage can inspection system, have a notable inherent limitation. These typically used cameras are, fundamentally, known as tri-stimulus devices. There are several different varieties of color digital cameras, but they typically use two, three or more color filters in order to ascertain the color information that is used for the imaging. Although it is possible to have custom filters, nearly all of them use standard red, green, and blue filters, thus dividing all color shades of visible light that enter the camera into one of those three buckets. The filters are chosen to try to approximate how the human eye senses color. With good illumination, setup, adjustment, and calibration, they can do a very reasonable job of color imaging. If implemented correctly, an inspection system using their tri-stimulus color data can do a very credible job of monitoring color changes, variations, or process shifts.

For example, a three-chip color camera utilizes three imaging chips, one dedicated to each of red, green, and blue color bands. The imaging chips are aligned with mirrors, optics, or prisms such that corresponding image information falls on the respective R, G or B image plane in a corresponding location. The three imaging array chips must be meticulously aligned or calibrated pixel-for-pixel with each other, which is one reason that this type of camera is considerably more expensive. In this way, a numerical intensity or signal strength value results truly for each pixel in each of the three color image planes. In all, there are only three numerical values representing the color information for each pixel.

A single chip color digital camera uses a different scheme. There are different techniques for achieving this, but the most common technique is to incorporate a Bayer filter. This type of single chip camera arrangement divides the entire matrix array of pixels on the imaging chip into groups of four pixels. Color filters overlay each of those pixels (the so-called Bayer filter) such that there are two green filtered pixels, one red, and one blue. They form a 2×2 array with the two green pixels being positioned diagonally opposite one another with their corners touching and the red and blue filling in the other two adjacent positions. This means that only one pixel out of the four is sensitive to red band information, while two pixels out of the four see green information, and only one pixel out of the four sees blue information. Technically, and especially noticeable for its fine details, there is only incomplete color information available for each pixel, or even for each 2×2 group of pixels. This causes various data gaps between pixels and can cause image aliasing and moiré patterns. The single chip arrangement causes a reduction of resolution, poorer color fidelity and more limited dynamic range, but it is a much less costly way of manufacturing a color camera.

Regardless of which type of color camera is used, only three pieces of numerical information are yielded to try to represent the exact color from each pixel or group of pixels. Sometimes a calibration matrix or tuning matrix is used in the process of calculating the 1×3 data array for each pixel, but the data is originally sourced and ends up as a 1×3 array of numerical values representing the relative strengths of red, green, and blue color information.

The visible color spectrum is defined by the range from about 400 nanometers to about 750 nanometers. If this 350 nanometer range were divided into three segments for each of the tri-stimulus filters, each range is still greater than 115 nanometers. The color filters, usually by design, do not have perfect razor-sharp cutoffs, so for practical manufacturing they must either typically overlap or have a trough or gap between the filters. Using one numerical piece of data to represent the entire variable complement of color data within a 115 nanometer range does not allow for a truly correct representation of a color signature. The color signature curve, even within the range of one of the color filters, can be substantial. If, as most color signatures do, it overlaps two or more of the color filter ranges, it is also not an accurate representation of the color signature curve. The more complicated the color signature curve is, the less likely it will be correctly represented by a tri-stimulus based sensor system.

It is well known in the color world, however, that a tri-stimulus color camera is no match for a spectrophotometer or spectrometer when it comes to absolute color measurement and comparison with a color specification. For example, spectrophotometers or spectrometers can be and often are calibrated so that they are traceable to a NIST color standard. A spectrometer or spectrophotometer, unlike the above noted cameras, divides the 350 nanometer visible light range into many more than the three pieces of data. Spectrometers and spectrophotometers have been made to possess many different resolutions and specifications over the many decades that they have been built. For purposes of this disclosure (including the Appendix), the terms spectrometer and spectrophotometer will be considered interchangeable, even though the latter generally includes an engineered illumination source while the former generally uses available light from various available sources. Depending on the intended use and the price point of the instrument, they could divide the visible spectrum into anywhere from 16 to several thousand parts. Even inexpensive spectrophotometers or spectrometers currently may typically have 1,024 data points to describe the color signature curve of the incoming visible light. Clearly, with this fine a resolution of the data, it can far more accurately represent the exact color and compare it to a precise standard or specification. A well designed spectrophotometer or spectrometer, if properly calibrated and used, can provide traceability back to NIST color standards and can provide transportable color measurements that can be used to ensure color standards worldwide for global manufacturers.

Also, so called "single chip" spectrometers are becoming more available. Single chip spectrometers effectively shrink a spectrometer to a tiny fraction of the size of traditional spectrometers. This is done in a number of ways but one method is to use a two-dimensional imaging chip with a colored mask over the photosensitive area of the chip which incorporates a gradation matrix with a slightly different colored filter for each pixel. An imaging lens focuses the light, from a common point to be examined, onto the entire (or a portion) imaging chip such that light from only the respective filtered colors reaches their respective pixels. Usually some type of homogenizing filter or integration sphere is employed in the light path so that the light which is diffracted onto the sensor is all of a similar spectral content to the average of the measurement "spot". The color signature of the spot of interest is then expressed as the numeric value array of signal outputs from the entire set of pixels corresponding to each color filter. Thus, if the color filter set is representative of the whole range of the spectrum to be measured, a signal signature is representative of the measured spot.

Because the imaging chip can be very small with today's technology, the whole spectrometer including the imaging lens and a light integration sphere, may be less than a few cubic millimeters in size. Size can vary according to the resolution, and the light gathering capacity. The more light gathering capacity, the faster the spectrometer can integrate enough light for a good reading at a given illumination intensity level. It is important that a spectrophotometer configuration is utilized which has enough light gathering, enough resolution, and enough speed to function properly in the desired application. Often, it is possible to trade off resolution for additional speed. For example, at a given sensitivity level, if twice as many pixels are used to gather light at each spectral range, then the device should have enough light to satisfy the minimum signal-to-noise ratio in half the time. This concept can be extended to allow an otherwise slower spectrometer to function at a much higher speed rate while still providing plenty of spectral data resolution for a given application.

Spectrophotometers or spectrometers must use correct and consistent illumination in order to get viable color measurements that are traceable to NIST, corporate, or other color standards. It is beyond the scope of this disclosure to teach the range of important illumination aspects that must be part of a good design, but it will be reviewed here briefly. This information is well known in the art and can be referenced in great depth elsewhere. Generally, specular illumination should be avoided for spectrophotometer or spectrometer work. That is to say, illumination which can create a direct specular reflection off the surface to be measured should be completely avoided. The very best lighting scheme is one wherein soft, homogeneous illumination is employed. With on-line beverage can or cylindrical object inspection, it is not usually possible to have truly homogeneous illumination, but the next best thing is the right kind of off-angle (non-specular) illumination. Another standard that is often used in spectrometry is soft, approximately 45° illumination. The assumption is that the dominant component of the illumination would be coming at roughly a 45° angle from either above or below the item. As this illumination scheme is implemented, the designer should be careful to avoid surfaces within the lighting field which would create hot-spot specular reflections which could ultimately detrimentally affect the accuracy and consistency of the color readings. While it is nearly impossible to keep the illumination completely pure with respect to these issues, every effort to do so will be repaid by better results in the final inspection/measurement system.

All things considered, it is quite challenging to image the perimeter of a can's decoration in order to get a truly accurate, transportable, and repeatable measurement of the absolute color in a known area of the can's decoration label or pattern. It is not humanly possible to do this manually. Digital color cameras are not sufficient to do this task at the highest levels of accuracy and repeatability. Spectrophotometers or spectrometers cannot typically be used at high speeds when the exact aiming spot that must be measured is not necessarily in the field of view of the instrument as a result of the random orientation of the beverage can's decoration.

BRIEF DESCRIPTION

In one aspect of the presently described embodiments, a system for monitoring and controlling color decoration on a rotationally non-oriented cylindrical object comprises a spectrophotometer or spectrometer, and an image-based machine vision inspection system including at least one camera, an illumination system, a microprocessor or computer-based processor, and timing/triggering/control electronics, the image-based monitoring inspection system being configured to capture an image of a perimeter of a color printed cylindrical object in a field of view and to feed image data to the processor, wherein the spectrophotometer or spectrometer is configured to take a spot color reading within the field of view of which a camera of the image process monitoring system is capturing the image and to feed spot color data to the processor, and wherein the processor is configured with a-priori knowledge of the coordinates of where the spot color spectrophotometer or spectrometer reading is located within the camera's field of view, to use at least one image logic algorithm to determine an exact positional orientation of the color decoration on the cylindrical object as imaged in the field of view, to use logic to determine if the spectrophotometer's or spectrometer's color spot data is from a desired location within the image, to use logic or rules to determine whether the spot color data is useable in comparison to the actual orientation of the sample captured image data and to output high precision color data based on the image data, the spot color data, and the determinations for at least one of monitoring the manufacturing process and correcting the manufacturing process.

In another aspect of the presently described embodiments, the cylindrical object is a color decorated container.

In another aspect of the presently described embodiments, the cylindrical object is a stream of non-rotationally oriented color decorated 2-piece beverage or food cans in the manufacturing process.

In another aspect of the presently described embodiments, the a-priori knowledge of the coordinates of the spectrophotometer's or spectrometer's spot color reading is determined by equipping the spectrophotometer or spectrometer lensing arrangement with a laser which makes an identifiable mark on the camera's image.

In another aspect of the presently described embodiments, the processor has logic to locate the identifiable mark and record corresponding coordinates for use in future inspections when the laser is not turned on.

In another aspect of the presently described embodiments, the processor uses the spot color data from the spectrophotometer or spectrometer to perform at least one of verifying camera color information, re-calibrating the camera, and augmenting camera color outputs.

In another aspect of the presently described embodiments, the processor uses additional logic algorithms to check calibration on all system cameras by way of statistical sampling and comparing of recent color readings by the spectrophotometer or spectrometer from non-simultaneous images formed by the cameras which include the spectrophotometer's or spectrometer's region of interest spot.

In another aspect of the presently described embodiments, the processor sends signals to move, parallel to a central axis of rotation of the cylindrical object, spectrophotometer or spectrometer positional aim so that another vertical band is monitored as cylindrical objects arrive at an inspection location in various rotational positions.

In another aspect of the presently described embodiments, an array of more than one spectrophotometer or spectrometer is connected to the processor, each of which is focused on a different inspection band on the cylindrical object.

In another aspect of the presently described embodiments, an array of spectrophotometers or spectrometers is provided, each of which is focused at a different inspection band around a girth of the cylindrical object, such that multiple bands of interest can be monitored without a need to move the spectrophotometers or spectrometers from fixed positions.

In another aspect of the presently described embodiments, the array of spectrophotometers or spectrometers can be moved as a unified unit in order to cover desired areas of the color decoration but to keep a spatial relationship between the spectrophotometers or spectrometers fixed.

In another aspect of the presently described embodiments, the spectrophotometer or spectrometer position can be one of manually, semi-automatically, and automatically moved to a location such that its focus spot is in a field of view of a different camera.

In another aspect of the presently described embodiments, the high precision color data is displayed so that it can be used to manually correct a decorating manufacturing process.

In another aspect of the presently described embodiments, the high precision color data is output to effect automatic corrections to a decorating manufacturing process.

In another aspect of the presently described embodiments, the output is connected to a control system which can directly drive servoed adjustments to at least one of a digital inker head, additional printing head, a print wheel adjustment, and an individual mandrel adjustment arrangement.

In another aspect of the presently described embodiments, the spectrophotometer or spectrometer based high precision color data is processed and organized so that the system can be initialized to output the data in its most useful form, which could be one of CIE XYZ, CIE Lab, CMYK, and CIERGB.

In another aspect of the presently described embodiments, the high precision color information is processed and output to determine when a statistically significant difference exists between a color quality standard that has been input into the system and a recent actual production color reading.

In another aspect of the presently described embodiments, a method for monitoring and controlling color decoration on a cylindrical object in a system having a spectrophotometer or spectrometer and an image-based machine vision inspection system including at least one camera, an illumination system, a microprocessor or computer-based processor, and timing/triggering/control electronics, comprises capturing an image of a perimeter of a color printed cylindrical object in a field of view, feeding image data to the processor, taking a spot color spectrophotometer or spectrometer reading within the field of view in which a camera of the image process monitoring system is capturing the image, feeding the spot color data to the processor, determining an exact positional orientation of the color decoration on the cylindrical object as imaged in the field of view, determining if the color spot data is from a desired location of the decorated label within the image, determining whether the spot color data is useable in comparison to the image data and outputting high precision color data based on the image data, the spot color data, and the determinations for at least one of monitoring the manufacturing process and correcting the decorating process.

In another aspect of the presently described embodiments, a system of color inspecting a general cylindrical container which is color decorated around its periphery, comprises a machine vision inspection system which has at least one imaging camera configured to capture an image of at least a section of a decorated periphery of a container, a spectrophotometer or spectrometer configured to gather precise color information from a desired region of interest of the decorated periphery where the camera has captured an image, at least one processor configured to compare color veracity of the image to the color information gathered by the spectrophotometer or spectrometer and to use the comparison if the desired section from which the spectrophotometer or spectrometer gathered color information is in a desired location on the decorated label to check the accuracy of the camera's color.

In another aspect of the presently described embodiments, a method of color inspecting a general cylindrical container which is color decorated around its periphery, comprises capturing a color image of at least a section of a decorated periphery of a container, gathering precise color information with a spectrophotometer or spectrometer from a desired section of the decorated periphery where the camera has captured an image, comparing color veracity of the image to the color information gathered by the spectrophotometer or spectrometer, and using the comparison if the desired section from which the spectrophotometer or spectrometer gathered color information is in a desired location to check the accuracy of the camera's color.

In another aspect of the presently described embodiments, the method further comprises at least one of using the color comparison information to perform one of correcting calibration of the camera and modifying camera color output, and using high resolution spectrophotometer or spectrometer color information to at least one of monitor and correct a color decoration process.

In another aspect of the presently described embodiments, the camera's color settings are recalibrated as a result of the comparison with the reading from the spectrophotometer or spectrometer.

In another aspect of the presently described embodiments, other cameras in a multi-camera cylindrical container inspection system are also re-calibrated wherein the computer/processor looks statistically at the camera color readings in the same decoration location to determine likely recalibration settings.

DETAILED DESCRIPTION

Figure 1:
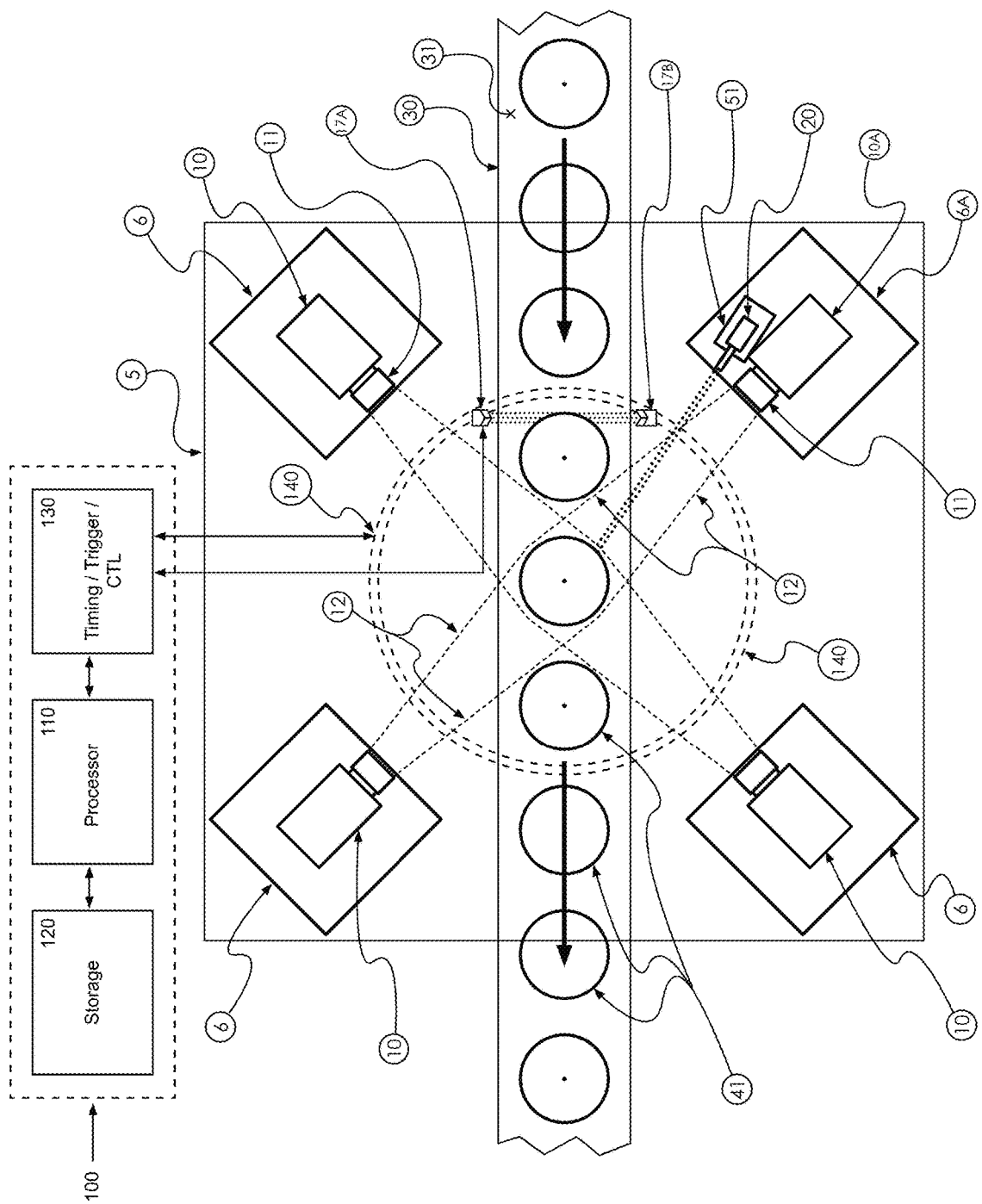
FIG. 1 is a view of an example system according to the presently described embodiments.

A digital camera based inspection system, as was discussed above, does not have the ability to measure color at the highest levels of repeatability and transportability. It does have the ability, however, with the correct implementation of various orientation algorithms, to determine the exact orientation and location of each individual can label as it is being inspected. A spectrophotometer or spectrometer, on the other hand, would not normally be useable for varying pattern conditions at high speed because it does not know anything about the orientation of the can's label decoration, i.e. it has no spatial information. It is merely integrating the visible light that is being reflected from its targeted field of view and measuring the exact amount of color information that is entering the instrument at each of its wavelength divisions. The presently described embodiments relate to a combined "smart" system that includes both a camera-based inspection system and a spectrophotometer or spectrometer. It would most typically incorporate at least one color imaging camera but it is possible to implement this concept with a non-color, gray-scale camera. According to the presently described embodiments, the combined system is intelligent or "smart" inasmuch as it is able to determine exactly where the spectrophotometer or spectrometer is aiming or looking with respect to the printed pattern on a cylindrical object such as a color decorated container (e.g., a beverage can or 2-piece beverage or food can), and able to correlate that location with data or color values that should be measured at that location.

As an example, if such a beverage can is being decorated or printed with seven different fundamental colors, it may be desirable to measure each of those colors at one or multiple places on the can's perimeter surface. A spectrophotometer or spectrometer is typically capable of looking at a finite spot diameter and at a fixed location. It is possible to expand or shrink the spot size, but changing the spot size is not the typical way that a spectrophotometer or spectrometer is utilized. It usually is calibrated to a particular spot size, measured at a particular angle, at a specified distance, and with a known character or color temperature mix of calibrated illumination. All of these parameters are critical to the design of a spectrophotometer or spectrometer to ensure consistent measurements. If it is desirable to have color measurement which are traceable to NIST standards, then even more care must be taken to calibrate to consistent industry standards.

One of the problems that the presently described embodiments solve when using a spectrophotometer or spectrometer in a can decoration color measurement application is the following. If the spectrophotometer or spectrometer is set up to see a spot size of ¼ inch in diameter, then it must be aiming at an area of the can's decoration which has only the specific color in question within the entire ¼ inch diameter spot or field of view at which it is aimed. It is good practice to have margin around the actual field of view to ensure any slight mis-aiming still provides that the measurement is kept uncontaminated by the surrounding colors. For consistency, it is a good practice for the spectrophotometer or spectrometer to be aimed orthogonally to the tangent of the can's diameter and perpendicular to the long axis of the can. If those angles are not maintained then a different reflectivity will result in a slightly different measurement. There are several steps the presently described embodiments incorporate to solve these and other problems.

In the simplest form of the presently described embodiments, the spectrophotometer or spectrometer will be aimed at a fixed spot which is somewhere within the field of view of one of the digital cameras of the inspection system. The inspection system has a-priori knowledge as to exactly where the spectrophotometer or spectrometer is aimed. It will also have knowledge of and/or store data on which regions of interest should have color measurements performed, and will continuously monitor for a circumstance whereby the region of interest coincides with the location the spectrophotometer or spectrometer has made its most recent measurement. In other words, since the exact rotary position of the can is not necessarily known or may be random, the image taken by the camera will be used to determine whether the desired measurement spot on the decorated label has actually been measured by the most recent snap of the spectrophotometric data. In this regard, various techniques and resources can be used to achieve these objectives, including use of stored information, various coordinate information such as X-Y or polar coordinates, and/or relational information with respect to images. The logic and data to keep track of this can either be in the machine vision system's control or in a separate or a supervisory control. In either case, when the vision system determines that the spectrophotometer or spectrometer was truly aiming at the correct or desired region when it captured its inspection data, it will instruct the system to accept the color measurement and will log the related data and information accordingly. If the correct spot is not measured, because of the can's rotational orientation, the data may simply be discarded or may be kept for use in other statistically processed ways.

The vision system or control will have, for example, a database to store information such as information described above including information as to which locations on the beverage can are to be measured and which colors are within the respective regions. It will have knowledge of and/or store the absolute color specifications for each spot or region and will monitor it accordingly with the spectrophotometer's or spectrometer's reported data. In this simplest form, as described previously, the spectrophotometer or spectrometer will be aimed at a fixed point on the can's surface. The rotary orientation relative to the can's long axis is typically relatively random. There may be some slight tendency, depending on the can handling system being used and where it is implemented in the manufacturing line, to favor certain orientations; but generally it is safe to consider the orientation to be completely random. This means that any color to be measured at any given time with this configuration must fall within the field of view of the spectrophotometer or spectrometer by merely rotating the can on its long axis. So, in our example, if all seven colors appear in the field of the spectrophotometer or spectrometer by merely rotating the can on its axis, then each of the colors will eventually appear and will be measured on a random basis in this inspection band. If each successive can in the high speed stream of containers can, with equal probability, appear in any given rotational orientation, then the statistical randomness tells us that the colors will each be measured with approximately the same frequency. If the colors that need to be measured on a container do not all appear at the same height, in other words, such that inspections of all successive cans with different rotations do not make each of them appear, then a more sophisticated version of the presently described embodiments can be used.

It is entirely possible to implement the presently described embodiments so that the camera's image and the spectrophotometer's spot are taken at different locations along the can's manufacturing travel path. As long as the can does not rotate between the image snap point and the spectrophotometer's data acquisition point, the same concepts that are taught here apply. Of course, in this case, if illumination is not provided by the system at the spot of color reading, a spectrophotometer, not a spectrometer, should be used. Also, if material handling equipment such as vacuum wheels or star wheels can assure a known orientation relationship between those two critical points, then the system could be implemented accordingly to account for the rotational positions as needed.

To incorporate a more sophisticated aspect of the presently described embodiments, the spectrophotometer or spectrometer can be mounted on a vertically adjustable mount which can be directed to different "Z" height or vertical positions along the long vertical axis of the container. By so doing, it facilitates the color inspection of an entirely new inspection band at a different "Z" height around the perimeter of the decoration. With the right configuration, the vision system can then command the spectrophotometer or spectrometer to travel to different "Z" locations to start the random sampling in that inspection band. Again, with the example of the seven color can decoration, if those seven colors appear in sizeable enough areas to completely fill the field of view of the spectrophotometer or spectrometer, it may inspect each of the seven colors after being sent to that can height band location. If it requires seven different "Z" band locations in order to see all of them, then the spectrophotometer or spectrometer must be repositioned accordingly. But if, for example, those suitable color inspection regions occur at only three different band levels, then the spectrophotometer or spectrometer would only need to be repositioned at those three levels in order to inspect all seven colors where it can view properly sized regions of interest. The vision system or control system could then execute a program which cycled the spectrophotometer's or spectrometer's location through the series of three locations on a repeating basis. In accordance with the relative importance of each of the respective colors, the dwell time at each band level could be adjusted to ensure that an adequate frequency of inspection was achieved to correspond to the relative importance of each of the seven colors.

In accordance with another aspect of the presently described embodiments, the spectrophotometer or spectrometer could be sent to the respective "Z" level inspection band according to the inspection desires of the user and their color specifications. If a particular color of interest occurs at five different "Z" band levels, then the spectrophotometer or spectrometer can be sent to all of those levels or some selected number of them on a sampling basis, to make sure that they are being monitored and measured according to the decoration process needs and the relative importance of the respective color areas.

For example, if a soft drink manufacturer decorates a particular can with three different colors but one of those colors is a signature color, it may want to concentrate most of the color inspection on the signature color. If the design of the can is such that the signature color occurs in all of the possible inspection band regions, it may want to inspect it at all inspection band levels, but it would not be able to if a sizable enough region of interest is not available on every inspection band level in order to completely fill the field of view of the spectrophotometer or spectrometer instrument. A repeating inspection band program could be used to go to, for example, 14 out of 18 workable inspection bands. The priorities and dwell times at each inspection band could be set to make sure the sampling is adequate based on the percent of adequately sized regions of interest around the band, and statistically significant. There may be multiple possibilities around any given inspection band or it might be viable anywhere around the 360° perimeter of any given inspection band or maybe only workable at two locations around the 360° of the inspection band where there is an adequate region of interest for the color inspection.

The actual field of view of the spectrophotometer or spectrometer is entirely up to the designer of the inspection system. There are many factors that would go into the decision as to what the inspected region of interest should be including the relative complexity of the label designs. Therefore, the anticipated size of the various regions of interest as well as the speed and light gathering requirements of the chosen spectrophotometer or spectrometer instrumentation design will all be factors in the field of view decision. Because the relative sensitivities of various types of spectrophotometers or spectrometers varies dramatically, it may be desired or required to have a larger or smaller field of view to allow proper inspection and gather enough light to work in conjunction with the chosen illumination system and technology. The use of a diffraction grating in a spectrophotometer or spectrometer inherently reduces the light that is available for integration at the various wavelengths. As a result, many spectrophotometers or spectrometers need substantially more light than, for example, other sensors or even cameras.

In the more sophisticated form of the moving spectrophotometer or spectrometer version of the presently described embodiments, the vertical position and timing could be completely under programmable control. A closed or open loop servo system to move the spectrophotometer or spectrometer to the desired inspection band height at the chosen speeds, to the desired repeatability level, and according to the most optimized pattern for inspecting all the desired colors according to their priorities. However, the presently described embodiments could be practiced by utilizing any mechanical means of selectively moving the spectrophotometer or spectrometer to the given inspection band "Z" location. The creative implementer of the presently described embodiments could use any number of mechanical devices including cams, linkage mechanisms, solenoids, air cylinders, or any other mechanical means that fit the cost and specification constraints of a particular implementation. The vertical movement could be affected manually with a simple hand crank or movement means or simply be slotted and adjustable manually to facilitate the adjustment periodically to a single height.

An even more sophisticated way of practicing another aspect of the presently described embodiments is to utilize multiple spectrophotometers or spectrometers which are already positioned at desirable "Z" height locations. If, for example, two spectrophotometers or spectrometers are used, then the number of vertical stops or color inspection bands to which the spectrophotometers or spectrometers would need to be sent, could be reduced by roughly half. If there were twenty vertical inspection bands in a given application, and one spectrophotometer or spectrometer was located at the lowest band or band one and the second spectrophotometer or spectrometer was located at the tenth band, then only ten vertical movement positions would be necessary in order to take spectrophotometric color readings at all twenty inspection bands. To take this scheme further, a third, fourth, and up to N spectrophotometers or spectrometers could be utilized with various vertical dimensional offsets accordingly. The system designer would have to determine the tradeoff values of various systemic costs. They would have to ask if it is more costly to have more spectrophotometers or spectrometers and a shorter vertical movement requirement, or if it is more valuable to have more spectrophotometers or spectrometers which could give more frequent statistical sampling of the color at the key inspection bands. It should be readily understood that there are various tradeoffs in the systemic implementation to get the desired color inspection information at the desired statistical frequency.

In an even more sophisticated implementation of the presently described embodiments, a spectrophotometer or spectrometer could be deployed at every vertical inspection band to eliminate the need for moving the spectrophotometer or spectrometer bank to any alternate vertical locations. This, of course, saves the cost of the movement mechanism and associated control along with the wear and tear on such equipment and it increases the frequency at which inspection samples can be taken. As the cost and size of spectrophotometers or spectrometers have continued to drop with new, often smaller technology, it makes this implementation more and more enticing and more practical to completely eliminate the moving parts. The single chip spectrophotometers or spectrometers are small enough to be positioned close together. They could even take the form of an array of spectrophotometers or spectrometers, spaced accordingly, and creating the capability to have simultaneous measurements of full color signatures in a vertical row of measurement spots. The same concept could be extended around the can such that multiple spots could be checked in any one girth band simultaneously. There could be one spectrophotometer or spectrometer to correspond to each camera, with multiple spectrophotometers or spectrometers also in the different girth bands that are in a camera's field of view.

Yet another aspect of the implementation of the presently described embodiments with more than one spectrophotometer or spectrometer is the fact that it provides for some built-in backup. For example, it is possible to move two different spectrophotometers or spectrometers to the same inspection band to verify the color results that are currently being obtained in that inspection location. It also means that a spectrophotometer or spectrometer sensor failure could have less impact since the other spectrophotometers or spectrometers could be automatically pushed into duty to perform the inspection band color checks of the failed sensor.

Yet another aspect of the presently described embodiments is to verify the color rendition produced from the inspection system's color camera. The spectrophotometer or spectrometer, being the far more definitive instrument, can actually be used to dynamically recalibrate the accuracy and absolute values of the information coming from the camera. It could be used to electronically recalibrate the actual camera output on a periodic basis. Or it could be used to modify the data in the vision system for better accuracy and repeatability over time. Since the camera and vision system see ostensibly all the pixels or regions of the can with every inspection, it has a distinct advantage over the spectrophotometer or spectrometer which is only sampling and providing useable data when the orientation is correct. Although any one of the cameras or all of the cameras can be utilized to determine the orientation of the decoration, and therefore when it is correct to use the spectrophotometer or spectrometer information, the absolute color information could be used by one, some, or all of the cameras as a correction and recalibration "standard". It can make for a very powerful cross-utilization of data between the vision system which is connected to multiple cameras and the one or more spectrophotometers or spectrometers.

For example, in a given inspection band, the spectrophotometer or spectrometer which is connected to a control system or the vision processor system, can accumulate a statistical control chart for a particular color that appears at a particular location within that inspection band. It could log the L, a, and b color information and chart the delta E value over time. It could also keep track of the statistical means and standard deviations of each measured area. It could do this in relation to each machine part, i.e. mandrel print blanket, etc., which had contributed to the can's decoration. The vision system could have all the statistical information as to how the can looked, not only in the region of interest for the spectrophotometer(s) or spectrometer(s), but also in all areas of each inspected can. That data can then be compared and contrasted to determine much information about the health of the decoration process and various aspects of the color printing.

Accordingly, in view of the above disclosure, the presently described embodiments, in at least one form, are implemented as a system and/or method for monitoring and controlling color decoration on a cylindrical object (such as a rotationally non-oriented object) including a spectrophotometer or spectrometer and an image-based machine vision inspection system. The inspection system includes, in at least one form, at least one camera, an illumination system, a microprocessor or computer-based processor, and timing/triggering/control electronics.

The image-based monitoring inspection system is configured to capture an image of a perimeter of a color printed cylindrical object in a field of view and to feed image data to the processor. The spectrophotometer or spectrometer is configured to take a spot color reading within the field of view of which a camera of the image process monitoring system is capturing the image and to feed spot color data to the processor.

Also, the processor is configured with a-priori knowledge of the coordinates of where the spot color reading is located within the camera's field of view, to use at least one image logic algorithm to determine an exact positional orientation of the color decoration on the cylindrical object as imaged in the field of view, to use logic to determine if the spot color data is from a desired location within the image of the decorated label, to use logic or rules to determine whether the spot color data is useable in comparison to the actual orientation of the sampled captured image data, and to output high precision color data based on the image data, the spot color data, and the determinations for at least one of monitoring the manufacturing process and correcting the manufacturing process.

The noted a-priori knowledge of the coordinates of the spot color reading is determined by equipping the spectrophotometer or spectrometer lensing arrangement with a laser which makes an identifiable mark on the camera's image. And, the processor has logic to locate the identifiable mark and record corresponding coordinates for use in future inspections when the laser is not turned on.

In these exemplary embodiments, the processor uses the spot color data from the spectrophotometer or spectrometer to perform at least one of verifying camera color information, re-calibrating the camera, and augmenting camera color outputs. In this regard, the processor uses additional logic algorithms to check calibration on all system cameras by way of statistical sampling and comparing of recent color readings by the spectrophotometer or spectrometer from non-simultaneous images formed by the cameras which include the spectrophotometer's or spectrometer's region of interest spot.

The processor also sends signals to move, parallel to a central axis of rotation of the cylindrical object, spectrophotometer or spectrometer positional aim so that another vertical band is monitored as cylindrical objects arrive at an inspection location in various rotational positions. As an alternative, an array of more than one spectrophotometer or spectrometer is connected to the processor, each of which is focused on a different inspection band on the cylindrical object. In another alternative, an array of spectrophotometers or spectrometers is provided, each of which is focused at a different inspection band around a girth of the cylindrical object, such that multiple bands of interest can be monitored without a need to move the spectrophotometers or spectrometers from fixed positions. In another alternative, the array of spectrophotometers or spectrometers can be moved as a unified unit in order to cover desired areas of the color decoration but to keep a spatial relationship between the spectrophotometers or spectrometers fixed. In another alternative, the spectrophotometer or spectrometer position can be one of manually, semi-automatically, and automatically moved to a location such that its focus spot is in a field of view of a different camera.

As to the output, the high precision color data is displayed so that it can be used to manually correct a decorating manufacturing process. Alternatively, the high precision color data is output to effect automatic corrections to a decorating manufacturing process. In this regard, the output is connected to a control system which can directly drive servoed adjustments to at least one of a digital inker head, additional printing head, a print wheel adjustment, and an individual mandrel adjustment arrangement.

Further, the spectrophotometer or spectrometer based high precision color data is processed and organized so that the system can be initialized to output the data in its most useful form, which could be one of, for example, CIE XYZ, CIE Lab, CMYK, and CIERGB. Still further, the high precision color information is processed and output to determine when a statistically significant difference exists between a color quality standard that has been input into the system and recent actual production color reading.

In addition, in view of the above disclosure, the presently described embodiments, in a least one form, are implemented as a system and/or method to check the accuracy of or calibrate a camera implemented in an overall system having a machine vision system (with at least one camera, e.g. multiple cameras, and in at least one example, four (4) cameras), a spectrophotometer or spectrometer, and a processor. Such a system or method is capable of capturing an image or color of an image of at least a section of a decorated periphery of a container, gathering precise color information with a spectrophotometer or spectrometer from a desired region of interest of the decorated periphery where the camera has captured an image, comparing color veracity of the image to the color information gathered by the spectrophotometer or spectrometer and using the comparison if the desired section from which the spectrophotometer or spectrometer gathered color information is in a desired location on the decorated label to check the accuracy of the camera's color. The information obtained can then be used, for example, for correcting calibration of a camera, modifying color output of a camera, recalibrating color settings of a camera, or re-calibrating multiple cameras. And, as above, the obtained information may be used to monitor or correct a color decoration process.

To further illustrate the presently described embodiments, one example way of reducing the subject embodiments to practice is shown in FIGS. 1-7B, being a key to the numbers used in the figures. It should be appreciated that the technical description, features and/or functionality described above in the description of the various presently described embodiments may, as appropriate, be selectively incorporated, as those of skill in the art will understand, either singly or in various combinations in the example embodiments described in connection with FIGS. 1-7B.

As shown in FIG. 1, an architecture for monitoring and controlling, for example, online container decoration specifications within a can manufacturing system or facility is shown. In this regard, a stream (e.g. a continuous stream) 41 of cylindrical items or objects (e.g. rotationally non-oriented cylindrical objects) such as color decorated containers including, for example, beverage or food cans (which may be, for example, 2-piece beverage or food cans), a conveyer or conveyor frame 30, cameras 10, and a spectrophotometer or spectrometer 20 are used in this arrangement. Also, a processing and control function 100 provides suitable processing, storage and control for elements that facilitate implementation of the presently described embodiments. For example, a processor 110, storage element 120 and timing/trigger/control module 130 are, in one form, implemented. Also, an illumination system or element 140 is representatively shown.

It will be appreciated that these elements, (e.g., the processor 110, storage element 120, timing/trigger/control element 130 and illuminator elements 140), may be a part of an overall manufacturing system or a part of a high-speed machine vision system that is integrated in or cooperatively functions with a manufacturing system or facility. Also, it should be appreciated that various elements within the contemplated arrangement may be in communication or in operative or physical connection with other elements to achieve desired control and/or feedback functionality. For example, the controller 130 is representatively shown in operative connection to the processor 110, illumination system 140 and part detection system 17.

It should also be appreciated that the presently described embodiments may be implemented using a variety of configurations, including a variety of suitable hardware configurations and/or software routines, along with appropriate memory and/or storage devices such, for example, storage element 120 (for example, read-only memory ROM, random access memory RAM, cache memory, any non-transitory computer readable medium, . . . etc.), as those of skill in the art will understand. For example, control and/or timing/triggering software routines may be stored on suitable memory or storage devices (for example, a non-transitory computer readable medium or the like) and run on processors or processor elements (such as hardware processors or processor elements) within the system. These routines, in at least one form, will control suitable hardware devices, such as cameras, spectrophotometers or spectrometers . . . etc, to achieve the presently described embodiments.

Figure 2:
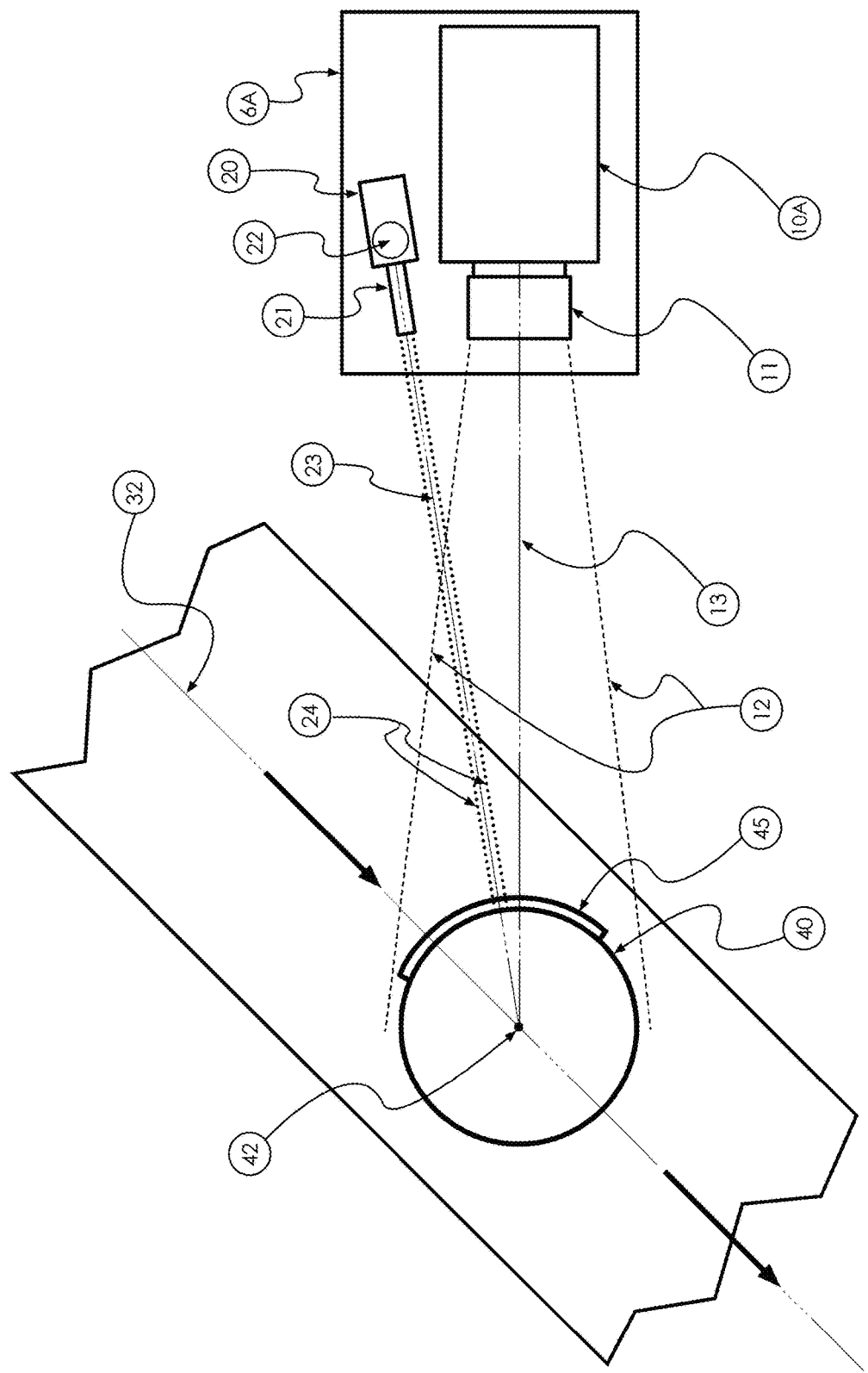
FIG. 2 is a view of an example system according to the presently described embodiments.

With more specific reference to FIGS. 1 and 2, in an example mode of operation, as the continuous stream of beverage cans (41) proceeds down a conveyor (30) in a can manufacturing facility, the cans ride on a conveyor belt (31) through a deco inspection system mounted on a system mounting structure 5. Although a single beverage can of the stream could be manually placed into an inspection location fixture as might be done in an inspection lab, this scenario details a high production system where the entire continuous stream is automatically taken through the inspection system. As a beverage can or cylindrical item or object (40) proceeds through the inspection station on the conveyor belt (31) supported by the conveyer or frame 30, the conveyor belt is being tracked typically with an encoder or resolver (not shown) which facilitates tracking the movement, speed and position of the beverage cans. Now, as the beverage can 40 passes the part detect sensor sender-receiver pair (17A (e.g. sender) & 17B (e.g. receiver)), the system registers that the beverage can 40 is approaching the inspection point and it is tracked by way of the encoder which articulates the conveyor belt movement. For an inspection system to do its best job, the beverage can 40 should be centered along the center line (32) of the conveyor and belt. Now, as the encoder or resolver tracks its position and it arrives so that its center (e.g. a center point of the can's long, symmetrical axis from, e.g., a top view) is at (42), the images should be snapped instantly and usually simultaneously by the multiple cameras (e.g. four (4) cameras, as shown in this example) (10) which are surrounding the beverage can (40) and each mounted on a camera mounting structure 6 or 6A. Each camera has a field of view (12) which encompasses the field of view that is desirable for the inspection but often that field of view is wider than the diameter of the can. If the system is designed and set up correctly, the horizontal center line of the field of view (13) should be as perpendicular as possible with the tangent of the beverage can's outer surface. While the camera's field of view (12) is typically wider than the diameter of the can, it is the central portion of the image or inspection periphery of can (45) which is typically used for further processing. The lens (e.g. camera imaging lens) (11) is chosen to yield the proper field of view (12) and it should be positioned so that the centerline of its field of view (13) is perpendicular to the side wall of the can (40).

While each of the vision inspection cameras (10) will be capturing images of their respective views of the can, one of them will be especially important to the presently described embodiments. The camera (10A), in this example the camera in whose field of view the spectrophotometer takes readings, has associated with it the spectrophotometer or spectrometer (20), both of which are mounted on a camera and spectrophotometer or spectrometer mounting structure 6A. The spectrophotometer or spectrometer (20) has a lensing or optics system (21) facilitating integrating the information that is within the sensory circle or region of measurement (25) on the can's outer surface. The center line of the field of view (23) arranged by the lensing system (21) should define a narrow width field of view (e.g. a spectrometer or spectrophotometer field of view) (24) which will image a spot or circular region (25) (see also, for example, FIGS. 4, 5A and 5B) and should have a center line (23) which is perpendicular to both a tangent line in the plane of the conveyor belt and perpendicular to a vertical line along the can's outer surface (40). Of course, it is very possible to implement with a spectrophotometer or spectrometer associated with each camera or moveable to service each camera, but it is more involved and more expensive to configure it in this way.

The color information which is imaged from the circular spot field of view (25) back to the spectrophotometer or spectrometer through the lensing system (21) typically would strike an integrating sphere (22) (e.g. inside the spectrometer or spectrophotometer) which mixes or homogenizes the color information for consistency. The spectrophotometer or spectrometer is then spreading that color information which is homogenized by the integrating sphere (22) by way of a diffraction grating onto an array of sensors. The sensors can be a line scan imaging or an area array imaging chip or an array of discrete sensors but the exact form factor of the spectrophotometer or spectrometer is beyond the scope of this disclosure. As has been mentioned, many different types of spectrophotometers or spectrometers and many different construction designs are available commercially. It must, however, be fast enough, have sufficient sensitivity, and have enough resolution to facilitate the application at hand by utilizing the same illumination that is being provided for the vision inspection portion of the system.

Figure 3:
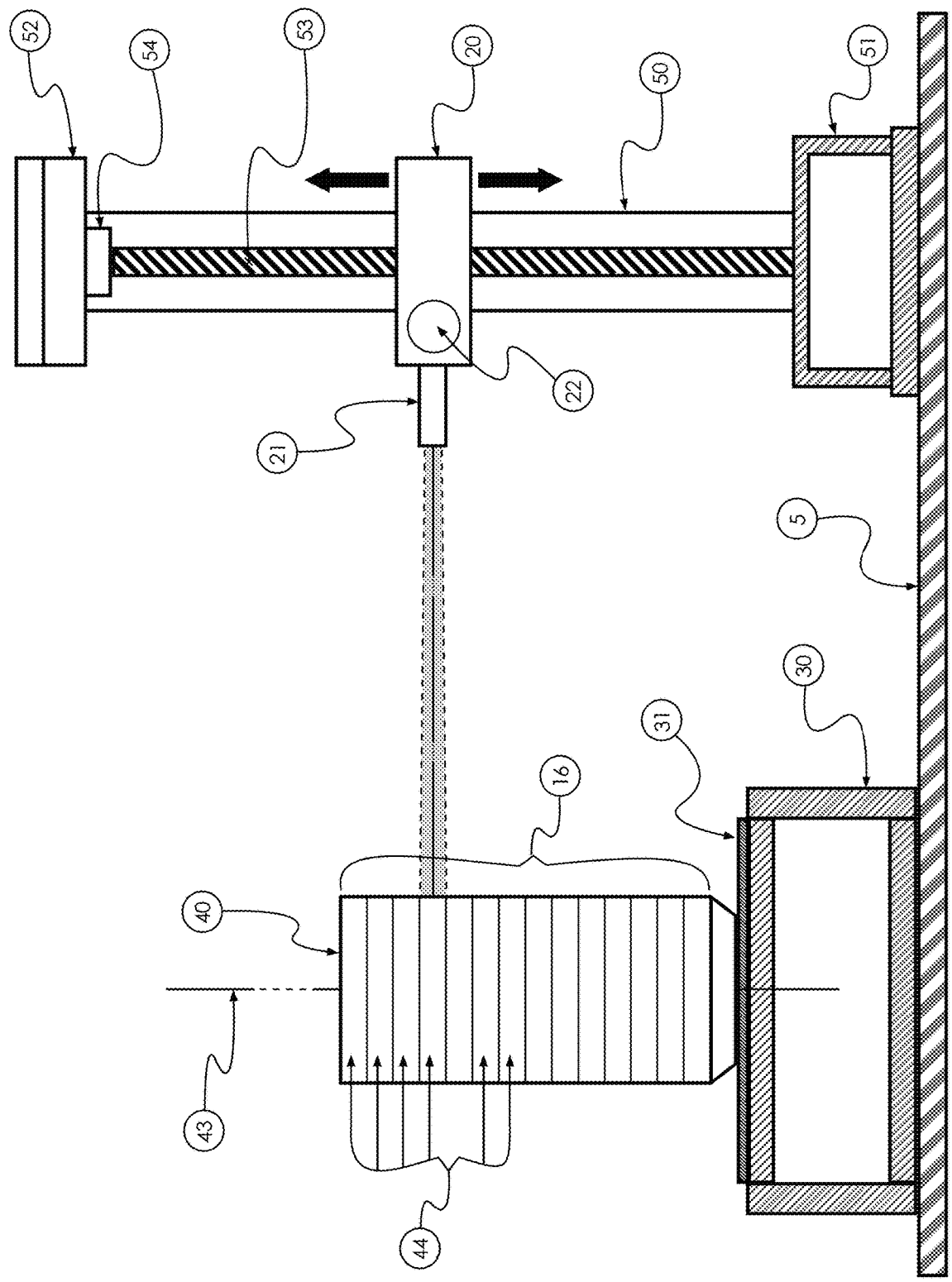
FIG. 3 is a view of an example system according to the presently described embodiments.
Figure 4:
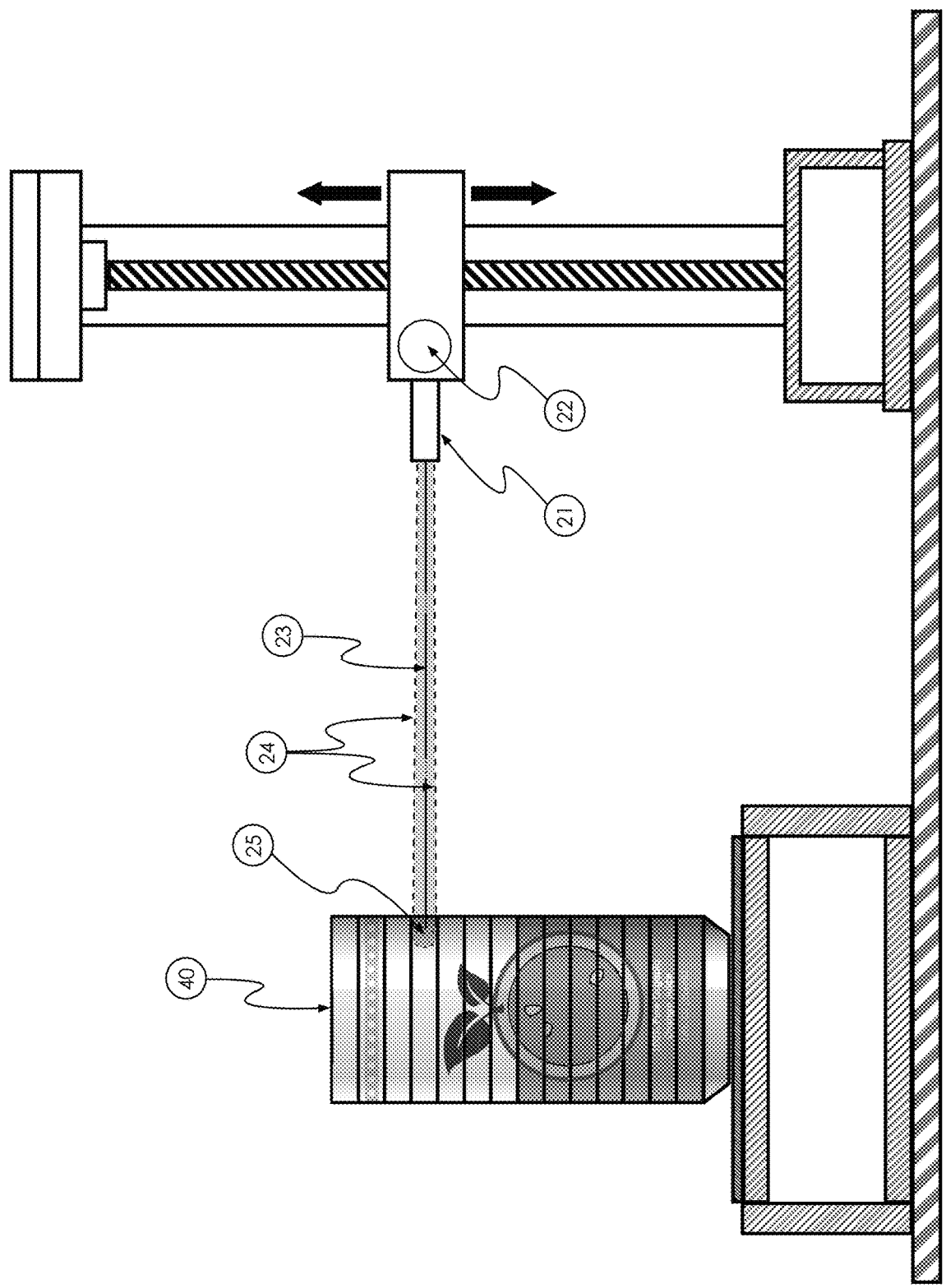
FIG. 4 is a view of an example system according to the presently described embodiments.
Figure 5A:
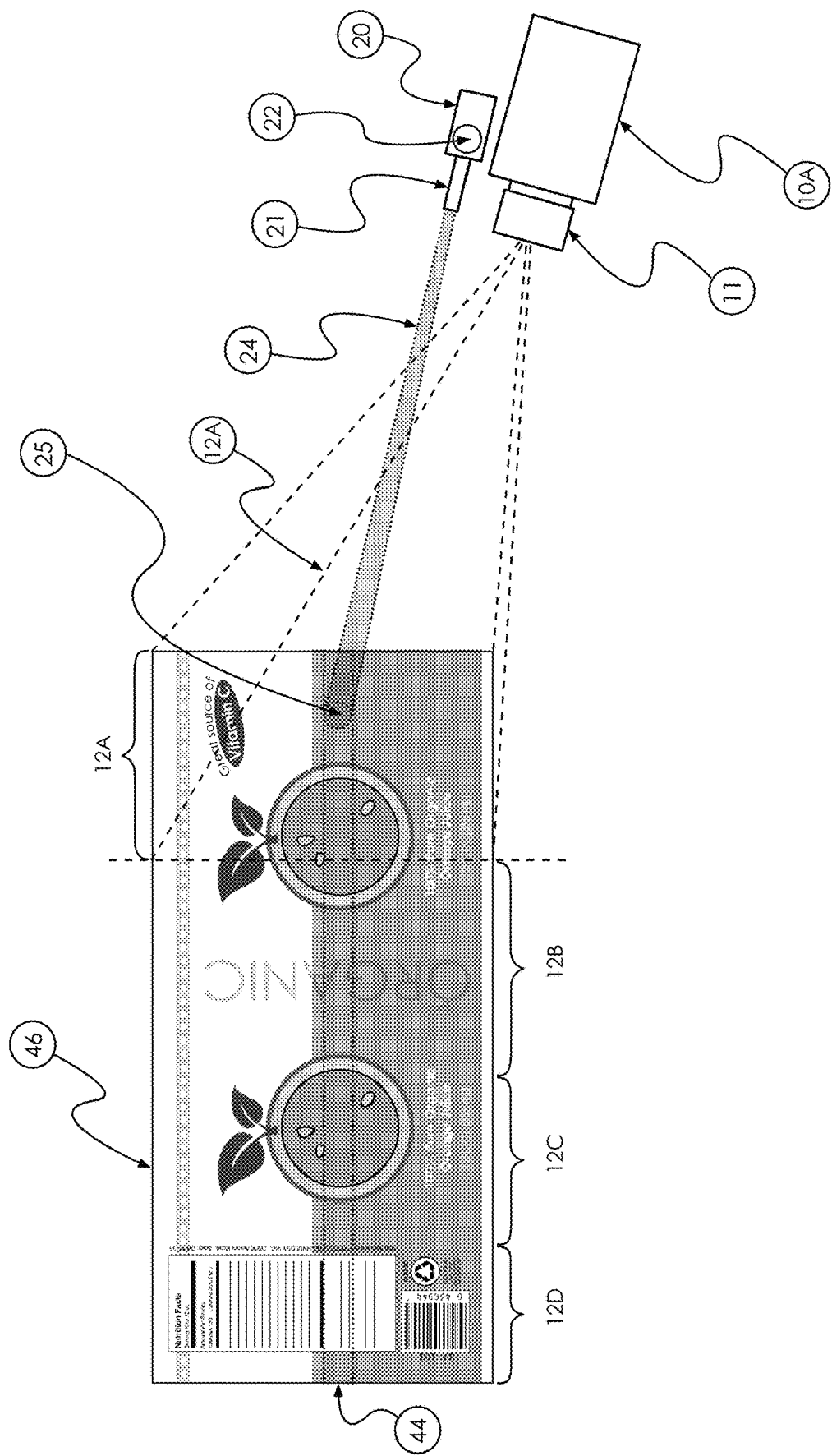
FIG. 5A is a view of an example system according to the presently described embodiments.

The brand owner customer or the quality control guide for a manufacturing plant will typically indicate which exact areas on the beverage can must be checked for precise color. FIG. 4 shows a beverage can with color decoration around its periphery (40) and showing the spot (25) which will be examined for precise color. In accord with the presently described embodiments, the spot 25 (and other locations) can be defined in a variety of ways including with coordinates such as X-Y or polar coordinates or with relational information with respect to the image or in other suitable manners. FIG. 3 shows a series of contiguous bands (44) (e.g. which may be within the camera's field of view) around the periphery or girth of the can in the decorated area (16) which defines the area or inspection region which may need to be checked by the camera. The camera (10A) which is associated with the spectrophotometer or spectrometer (20) has captured an image represented in FIG. 5A by the area of interest (12A). The area of interest 12A is one portion of the entire image or pseudo print blanket 46 which can be comprised of multiple images. It should be appreciated that the other areas or fields of view 12B, 12C and 12D originate from the cameras 10B, 10C and 10D, respectively. Within that area of interest (12A) is the circle (25) where the spectrophotometer or spectrometer has gathered its color data. The vision system will analyze its image (12A) and will determine where the area (25) happens to fall in the random orientation of the can whose images have just been taken. If the orientation of the beverage can happens to coincide with having the spot (25) in the correct radial position on the band (44) at which it is focused, as shown in FIG. 5A, then the system will be able to, for example, use the color information from the spot reading to determine if the color is acceptable, and, if desired, use the information for feedback to correct or monitor color in the decorating process, and/or compare the color that the camera has determined to the color that the spectrophotometer or spectrometer has determined. It is possible, to increase the frequency of acquiring a useful spectrophotometer or spectrometer reading, to define a tolerance band that is somewhat larger than the precise inspection spot area, if it can be tolerated by the quality standards. A detailed comparison of these two areas can then take place. That determination will weigh heavily in the direction of the spectrophotometer or spectrometer reading which has much higher resolution, as has been described, than the tri-stimulus camera sensor.

Figure 5B:
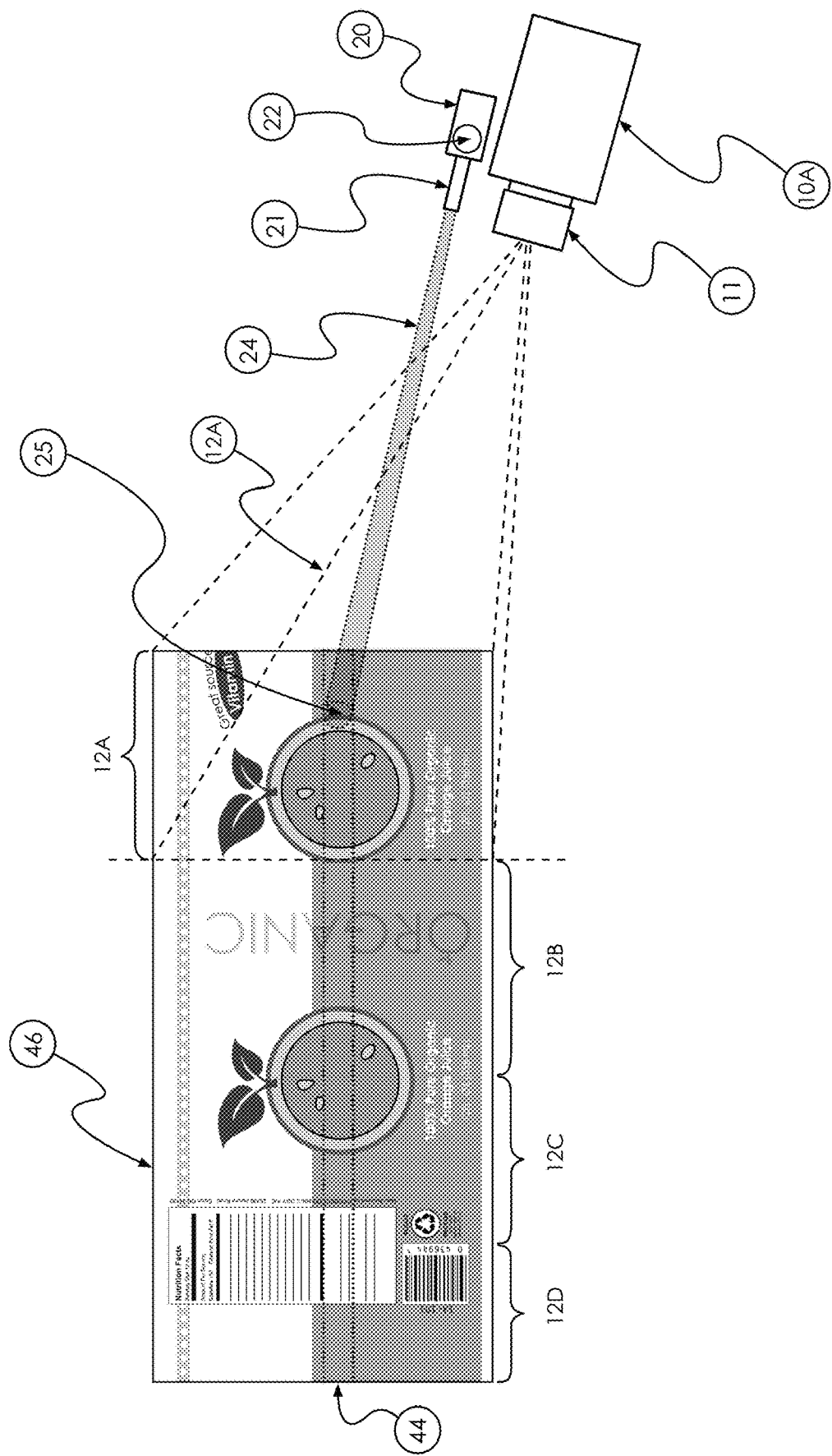
FIG. 5B is a view of an example system according to the presently described embodiments.

If the spectrophotometer or spectrometer spot (25) happens to fall in an area which does not have a homogeneous color to be checked, such as shown in FIG. 5B, then the color data would not be viable for the verification of the isolated color. The concept can be observed by looking at the difference between where the spectrophotometer's or spectrometer's data "spot" (25) falls in FIG. 5A compared to where it falls in FIG. 5B. The case such as 5B does not render the data completely useless. The exact orientation of the decoration according to the image from camera (10A) will determine exactly what color information would be available within the data spot (25) for the given orientation. The implementer of the presently described embodiments or the user of the system will have to make a technical decision as to whether it is useful in various non-homogeneous (non-single color) locations. Some decoration patterns may lend themselves to "mixed color" circumstances wherein the color data from such regions can be used to great advantage. An example would be a region made up of small mixed color dots yielding a rainbow-like region.

With reference back to FIG. 3, a spectrophotometer or spectrometer vertical positioning device 50 is also shown. The vertical positioning device 50 comprises a base 51, servo-motor 52, ball screw 53 and encoder 54—although it is to be appreciated that the vertical positioning device 50 may take a variety of forms. As shown, the spectrophotometer or spectrometer 20 can be moved vertically using vertical positioning device 50 to take readings from various bands 44 circumferentially disposed around can 40 along can center line 43 (e.g. a centerline of can's long, symmetrical axis) —according to the implementations of the presently described embodiments.

Figure 6:
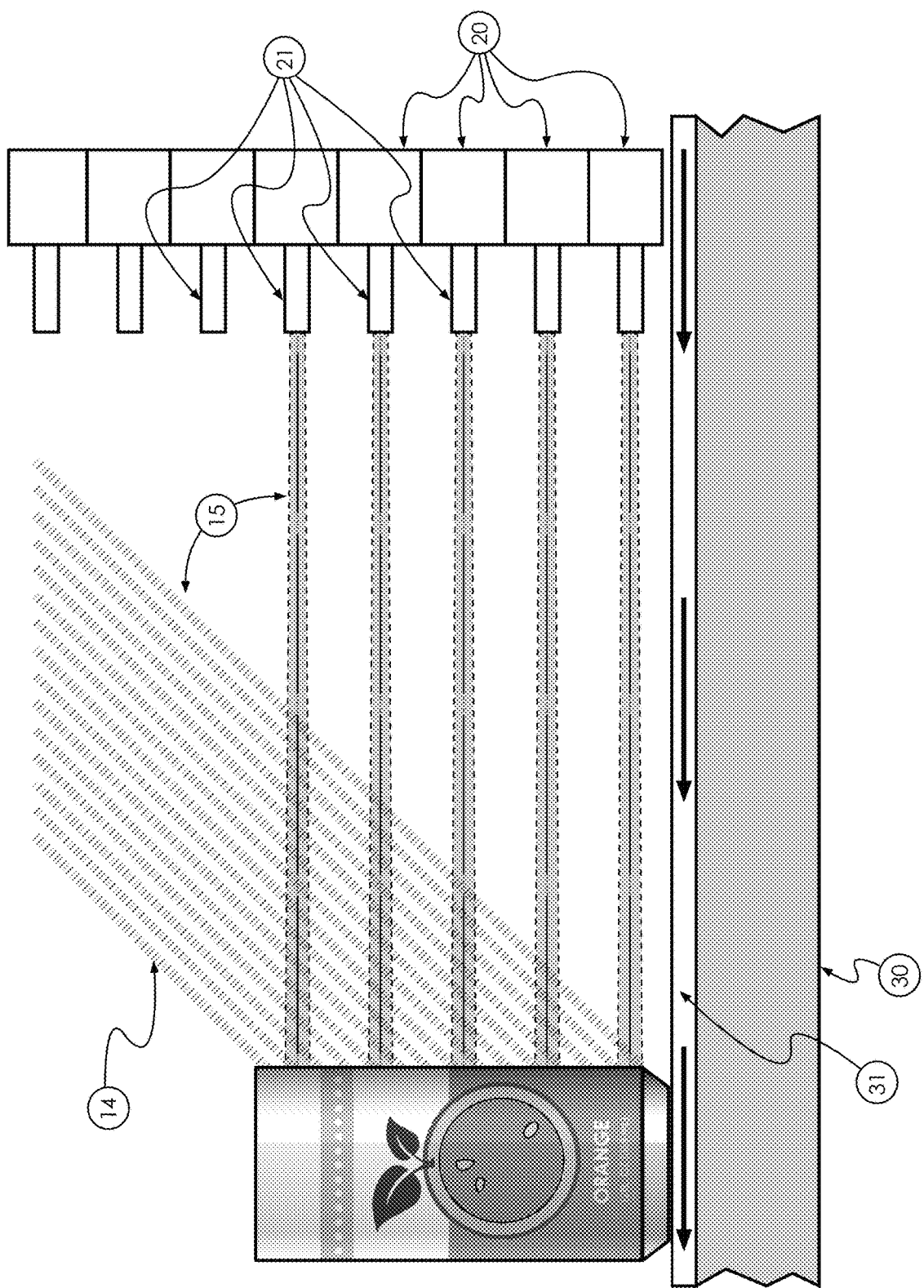
FIG. 6 is a view of an example system according to the presently described embodiments.

With reference to FIG. 6, another variation of the presently described embodiments is shown. More specifically, rather than translating a single spectrophotometer or spectrometer 20 using a vertical positioning device 50 as shown in FIGS. 3 and 4, a plurality of spectrophotometers or spectrometers 20 could be mounted vertically, each having its lensing or optics 21 aimed to take readings from corresponding bands 44 of the can being inspected on the conveyor belt 31. Also, FIG. 6 illustrates that the illumination field 14 has an illumination angle 15 of approximately 45°, in at least one embodiment.

Ultimately, the end game for monitoring the absolute color of the various areas of a beverage can is to more precisely control the manufacturing process. Knowing the periodic color drifts and all the various color and decoration variations from the correct specification, is ultimately useful to close the loop and correct the problems dynamically or proactively. Many of the decorating process root cause variations can actually be understood and ultimately remedied with enough data and tracking. Scant data is available currently on many of these root causes because of the historical difficulty of obtaining real-time information. The presently described embodiments allow the gathering of the valuable real-time information so that manual corrections can be enacted in an intelligent and timely way. It is anticipated that the machine corrections to the decorator would be done manually on older machines and then gradually become semiautomatic as retrofits are enacted to existing machines and then fully automatic as sophisticated retrofits are implemented and as new machines are designed to incorporate the technology. Servo controls of many adjustments, automatic or digital control of inker heads, and automated ink handling will allow the gathered color information to be used to fully automate the process of closing the loops. Getting precise data about the exact colors which are being applied in the printing or decorating process is enormously useful to any correction process which will be implemented.

Figure 7A:
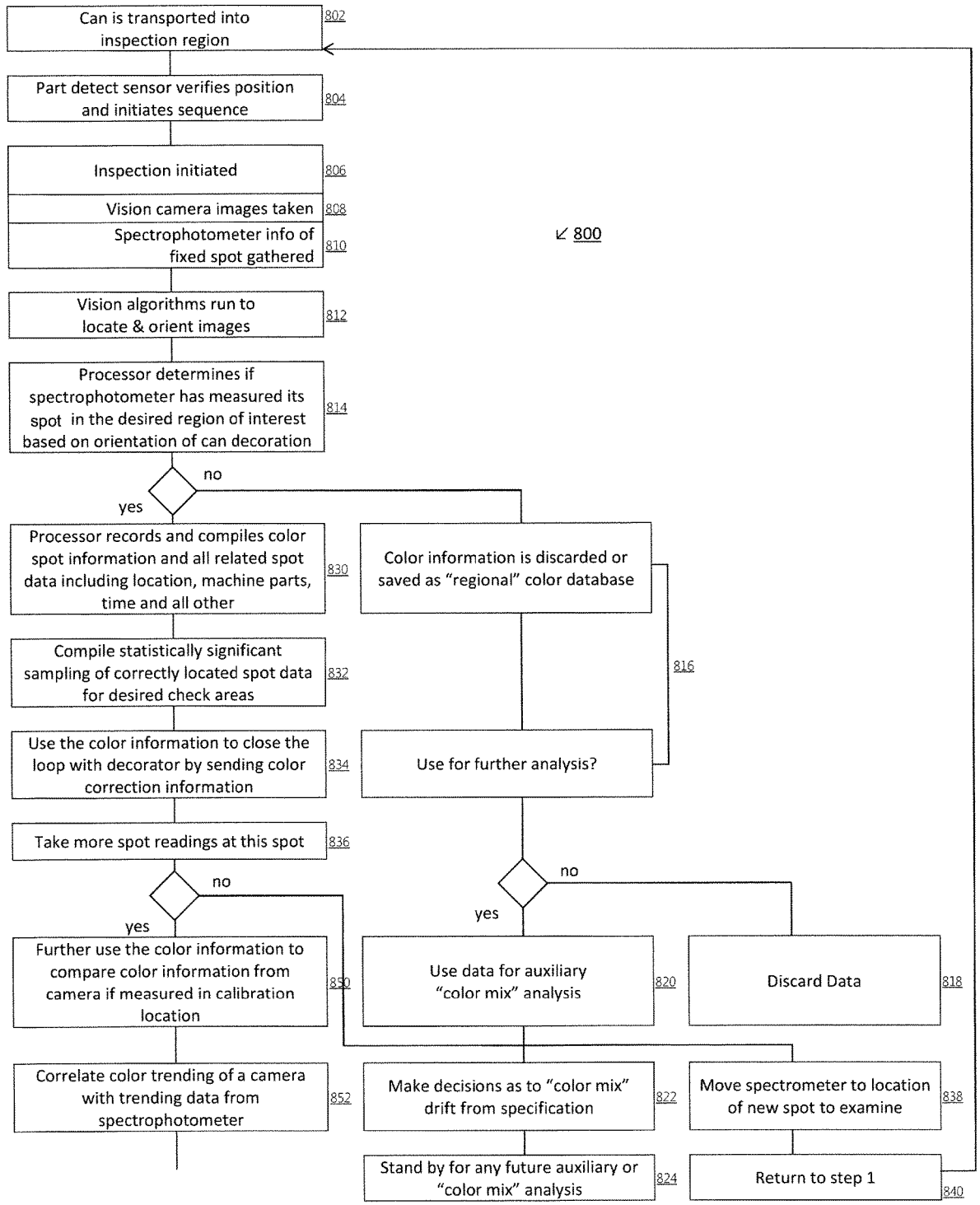
FIG. 7A is a flowchart illustrating an example method according to the presently described embodiments.
Figure 7B:
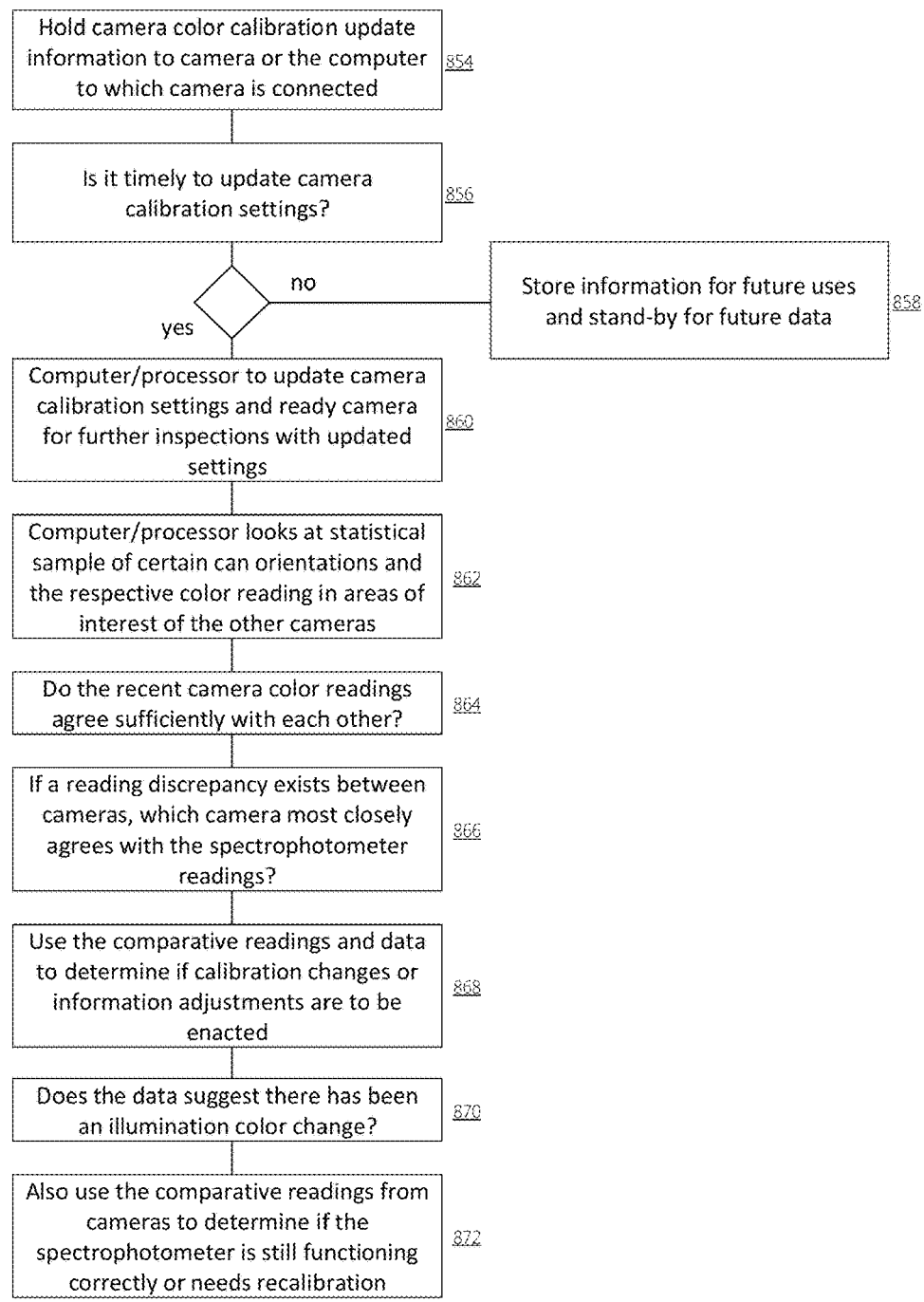
FIG. 7B is a continuation of the flowchart of FIG. 7A.

In this regard, an example method 800 for examining the absolute color of printed objects and calibrating according to the presently described embodiments is shown in FIGS. 7A and 7B. It should be appreciated that, as alluded to above, this example method, as well as other methods according to the presently described embodiments, may be implemented in a variety of manners, including using a suitable combination of hardware, software, and memory/storage, as will be understood by those of skill in the art. As shown, a can is transported into an inspection region (at 802). A part detect sensor verifies the position and initiates an appropriate sequence of color inspection (at 804). The inspection is then initiated (at 806).

In this regard, vision camera images are taken or captured (at 808) and spectrophotometer or spectrometer information regarding fixed spot readings is gathered (at 810). Next, vision algorithms are run to locate and orient images (at 812). A processor then determines if spectrophotometer or spectrometer has measured its spot in the desired region of interest based on an orientation of the can decoration (at 814).

If not, color information is discarded or saved at a "regional" color database and a determination is made as to whether further analysis is desired (at 816). If not, data is discarded (at 818). If further analysis is desired, data is used for auxiliary color mix analysis (at 820). Next, decisions as to "color mix" drift from a specification are made (at 822) and the system stands by for any future auxiliary or color mix analysis (at 824).

Referring back to decision 814, if the processor determines that the spot was measured in a desired region of interest, the processor records and compiles color spot information and all related spot data including location, machine parts, time and all other relevant data (at 830). Next, the processor compiles statistically significant sampling of corrected located spot data for desired check areas (at 832). The color information is then used to close the loop with the decorator by sending color correction information (at 834).

A determination is then made whether to take more spot readings at this spot (at 836). If not, the spectrophotometer or spectrometer is moved to a location of a new spot to examine (at 838) and the process returns to 802 (at 840).

If more spot readings are to be taken, the color information is used to compare color information from the camera if measured in a calibration location (at 850). Color trending of a camera is correlated with trending data from spectrophotometer or spectrometer (at 852). Then, camera color calibration update information is held to the camera or the computer to which camera is connected (at 854).

A determination is made whether it is timely to update camera calibration settings (at 856). If not, information is stored for future uses and the system stands-by for future data (at 858). If an update is timely, the computer/processor updates camera calibration settings and prepares the camera for further inspections with the updated settings (at 860). The computer/processor also looks at statistical sample of certain can orientations and the respective color reading in areas of interest of the other cameras (at 862). A determination is made whether the recent camera color readings agree sufficiently with each other (at 864).

If a reading discrepancy exists between cameras, a determination is made as to which camera most closely agrees with the spectrophotometer or spectrometer readings (at 866). The comparative readings and data are used to determine if calibration changes or information adjustments are to be enacted (at 868). If the data suggest there has been an illumination color change (at 870), the system acts accordingly. Also, the comparative readings from cameras are used to determine if the spectrophotometer or spectrometer is still functioning correctly or needs recalibration (at 872).

While it is beyond the scope of this disclosure to describe the hundreds of ways that the various components of a decorator could be automatically adjusted, there are many who understand how to adjust a decorator but who have lacked the real-time color and spatial information to implement automatic correction and process control. It simply happens at too high a speed in most beverage can plants for it to ever be done manually. The presently described embodiments should facilitate a critical step function in the availability of accurate, real-time information with which the decorating process can run in a closed loop way and be dramatically optimized compared to what has been available historically. One of skill in the art should be able to extrapolate and use the information taught here to apply the technology concepts to improve and close the loops on a wide range of decorating and printing applications.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A system for monitoring and controlling color decoration on a rotationally non-oriented cylindrical object comprising:
   a spectrophotometer or spectrometer; and,
      an image-based machine vision inspection system including at least one camera, an illumination system, a processor, and timing/triggering/control electronics, the image-based monitoring inspection system being configured to capture an image of a perimeter of a color printed cylindrical object in a field of view and to feed image data to the processor;
      wherein the spectrophotometer or spectrometer is configured to take a spot color reading within the field of view of which a camera of the image process monitoring system is capturing the image and to feed spot color data to the processor; and,
      wherein the processor is configured:
      with a-priori knowledge of coordinates of where the spot color reading is located within the camera's field of view,
      to use at least one image logic algorithm to determine an exact positional orientation of the color decoration on the cylindrical object as imaged in the field of view,
      to use logic to determine if the spot color data is from a desired location within the image,
      to use logic or rules to determine whether the spot color data is useable in comparison to an actual orientation of captured image data, and
      to output high precision color data based on the image data, the spot color data, and determinations for at least one of monitoring a manufacturing process and correcting the manufacturing process.

2. The system as set forth in claim 1 wherein the cylindrical object is a color decorated container.

3. The system as set forth in claim 1 wherein the cylindrical object is a stream of non-rotationally oriented color decorated 2-piece beverage or food cans in the manufacturing process.

4. The system as set forth in claim 1 wherein the a-priori knowledge of the coordinates of the spectrophotometer's or spectrometer's spot color reading is determined by equipping a spectrophotometer or spectrometer lensing arrangement with a laser which makes an identifiable mark on the camera's image.

5. The system as set forth in claim 4 wherein the processor has logic to locate the identifiable mark and record corresponding coordinates for use in future inspections when the laser is not turned on.

6. The system as set forth in claim 1 wherein the processor uses the spot color data from the spectrophotometer or spectrometer to perform at least one of verifying camera color information, re-calibrating the camera, and augmenting camera color outputs.

7. The system as set forth in claim 6 wherein the processor uses additional logic algorithms to check calibration on all system cameras by way of statistical sampling and comparing of recent color readings by the spectrophotometer or spectrometer from non-simultaneous images formed by the cameras which include the spectrophotometer's or spectrometer's region of interest spot.

8. The system as set forth in claim 1 wherein the processor sends signals to move, parallel to a central axis of rotation of the cylindrical object, spectrophotometer or spectrometer positional aim so that another vertical band is monitored as cylindrical objects arrive at an inspection location in various rotational positions.

9. The system as set forth in claim 8 wherein the spectrophotometer or spectrometer position can be one of manually, semi-automatically, and automatically moved to a location such that its measurement spot is in a different portion of field of view of a camera or in a different band of the can.

10. The system as set forth in claim 1 wherein an array of more than one spectrophotometer or spectrometer is connected to the processor, each of which is focused on a different inspection band on the cylindrical object.

11. The system as set forth in claim 10 wherein an array of spectrophotometers or spectrometers is provided, each of which is focused at a different inspection band around a girth of the cylindrical object, such that multiple bands of interest can be monitored without a need to move the spectrophotometers or spectrometers from fixed positions.

12. The system as set forth in claim 10 wherein the array of spectrophotometers or spectrometers can be moved as a unified unit in order to cover desired areas of the color decoration but to keep a spatial relationship between the spectrophotometers or spectrometers fixed.

13. The system as set forth in claim 1 wherein the high precision color data is displayed so that it can be used to manually correct a decorating manufacturing process.

14. The system as set forth in claim 1 wherein the high precision color data is output to effect automatic corrections to a decorating manufacturing process.

15. The system as set forth in claim 1 wherein the output is connected to a control system which can directly drive servoed adjustments to at least one of a digital inker head, additional printing head, a print wheel adjustment, and an individual mandrel adjustment arrangement.

16. The system as set forth in claim 1 wherein the spectrophotometer or spectrometer based high precision color data is processed and organized so that the system can be initialized to output the data in its most useful form, which could be one of CIE XYZ, CIE Lab, CMYK, and CIERGB.

17. The system as set forth in claim 1 wherein the high precision color information is processed and output to determine when a statistically significant difference exists between a color quality standard that has been input into the system and a recent actual production color reading.

18. A method for monitoring and controlling color decoration on a cylindrical object in a system having a spectrophotometer or spectrometer and an image-based machine vision inspection system including at least one camera, an illumination system, a processor, and timing/triggering/control electronics, the method comprising:
capturing an image of a perimeter of a color printed cylindrical object in a field of view;
feeding image data to the processor;
taking a spot color spectrophotometer or spectrometer reading within the field of view in which a camera of the image process monitoring system is capturing the image;
feeding spot color data to the processor;
determining an exact positional orientation of the color decoration on the cylindrical object as imaged in the field of view,
determining if the spot color data is from a desired location of the decorated label within the image,
determining whether the spot color data is useable in comparison to the image data and,
outputting high precision color data based on the image data, the spot color data, and determinations for at least one of monitoring a manufacturing process and correcting the manufacturing process.

19. A system of color inspecting a general cylindrical container which is color decorated around its periphery, the system comprising:
a machine vision inspection system which has at least one imaging camera configured to capture images of at least a section of a decorated periphery of a container;
a spectrophotometer or spectrometer configured to gather precise color information from a desired region of interest of the decorated periphery where the camera has captured an image;
at least one processor configured to make a comparison of color veracity of the image to the color information gathered by the spectrophotometer or spectrometer and to use the comparison if a desired section from which the spectrophotometer or spectrometer gathered color information is in a desired location on the decorated periphery to check the accuracy of the camera's color.

20. A method of color inspecting a general cylindrical container which is color decorated around its periphery, the method comprising:
capturing a color image by a camera of at least a section of a decorated periphery of a container;
gathering precise color information with a spectrophotometer or spectrometer from a desired section of the decorated periphery where the camera has captured an image;
comparing color veracity of the image to the color information gathered by the spectrophotometer or spectrometer; and
using the comparison if the desired section from which the spectrophotometer or spectrometer gathered color information is in a desired location to check color accuracy of the camera.

21. The method as set forth in claim 20 further comprising at least one of:
using the color comparison information to perform one of correcting calibration of the camera and modifying camera color output; and
using high resolution spectrophotometer or spectrometer color information to at least one of monitor and correct a color decoration process.

22. The method as set forth in claim 20 wherein the camera's color settings are recalibrated as a result of the comparison with the reading from the spectrophotometer or spectrometer.

23. The method as set forth in claim 22 wherein other cameras in a multi-camera cylindrical container inspection system are also re-calibrated wherein the computer/processor looks statistically at the camera color readings in the same decoration location to determine likely recalibration settings.

* * * * *